United States Patent
Dougherty et al.

(10) Patent No.: US 7,092,964 B1
(45) Date of Patent: Aug. 15, 2006

(54) METHOD OF COLLECTING MARKET RESEARCH INFORMATION

(75) Inventors: Christopher Dougherty, Highland Park, IL (US); Matthew A. Guido, Chicago, IL (US); Kurt B. Uhlir, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 335 days.

(21) Appl. No.: 10/185,536

(22) Filed: Jun. 27, 2002

Related U.S. Application Data

(63) Continuation-in-part of application No. 09/887,198, filed on Jun. 22, 2001.

(51) Int. Cl.
G06F 7/00 (2006.01)
G06F 17/00 (2006.01)

(52) U.S. Cl. .............. 707/104.1; 707/100; 707/10; 707/3; 705/26

(58) Field of Classification Search ............. 707/104, 707/3, 200, 104.1, 100, 10; 705/26
See application file for complete search history.

(56) References Cited

U.S. PATENT DOCUMENTS

| | | | | |
|---|---|---|---|---|
| 5,627,549 | A * | 5/1997 | Park ........................ | 701/300 |
| 5,664,948 | A | 9/1997 | Dimitriadis et al. .... | 434/307 R |
| 6,072,396 | A | 6/2000 | Gaukel .................... | 340/573.4 |
| 6,098,048 | A | 8/2000 | Dashefsky et al. ......... | 705/10 |
| 6,122,520 | A | 9/2000 | Want et al. ................ | 455/456 |
| 6,199,045 | B1 | 3/2001 | Giniger et al. ............... | 705/1 |
| 6,202,022 | B1 | 3/2001 | Ando ........................ | 701/200 |
| 6,208,866 | B1 | 3/2001 | Rouhollahzadeh et al. . | 455/456 |
| 6,223,122 | B1 | 4/2001 | Hancock et al. .......... | 701/200 |
| 6,232,915 | B1 | 5/2001 | Dean et al. ............ | 342/357.07 |
| 6,259,381 | B1 | 7/2001 | Small ....................... | 340/988 |
| 6,266,612 | B1 | 7/2001 | Dussell et al. ............. | 701/207 |
| 6,292,724 | B1 | 9/2001 | Apsell et al. ................ | 701/29 |
| 6,353,398 | B1 | 3/2002 | Amin et al. ............... | 340/995 |
| 6,360,167 | B1 | 3/2002 | Millington et al. ......... | 701/211 |
| 6,381,465 | B1 | 4/2002 | Chern et al. ............... | 455/466 |
| 6,414,602 | B1 * | 7/2002 | Polyakov ................. | 340/691.6 |
| 6,438,561 | B1 * | 8/2002 | Israni et al. ............. | 707/104.1 |
| 6,442,479 | B1 * | 8/2002 | Barton ...................... | 701/213 |
| 6,452,498 | B1 * | 9/2002 | Stewart ................... | 340/573.1 |
| 6,604,083 | B1 | 8/2003 | Bailey ........................ | 705/10 |
| 6,785,551 | B1 | 8/2004 | Richard .................. | 455/456.1 |
| 6,970,131 | B1 | 11/2005 | Percy et al. ........... | 342/357.07 |

(Continued)

FOREIGN PATENT DOCUMENTS

EP        1081666 A2    3/2001

(Continued)

*Primary Examiner*—Greta Robinson
*Assistant Examiner*—Kuen S. Lu
(74) *Attorney, Agent, or Firm*—Jon D. Shutter; Frank K. Kozak; Grace L. O'Brien

(57) ABSTRACT

A method of collecting market research information is disclosed. A geographic database contains data entities that represent geographic features, such as roads, located in a geographic region. Advertising zones are defined within the geographic region. Users of mobile computing platforms are provided with geographically-related services that use the geographic database. As users of the mobile computing platforms travel in the geographic region, the locations of the mobile computing platforms are determined. Demographic information of the mobile computing platform is associated with the position of the mobile computing platform. A market research record identifies which of the mobile computing platforms are located within or passing through one of the advertising zones.

21 Claims, 13 Drawing Sheets

U.S. PATENT DOCUMENTS

| | | | |
|---|---|---|---|
| 2001/0018340 A1 | 8/2001 | Tagi | 455/414 |
| 2001/0043148 A1* | 11/2001 | Stewart | 340/988 |
| 2002/0002552 A1* | 1/2002 | Schultz et al. | 707/3 |
| 2002/0032035 A1 | 3/2002 | Teshima | 455/456 |
| 2002/0049742 A1* | 4/2002 | Chan et al. | 707/1 |
| 2002/0065691 A1* | 5/2002 | Twig et al. | 705/7 |
| 2002/0147644 A1 | 10/2002 | Subramanian et al. | 705/14 |
| 2003/0006911 A1 | 1/2003 | Smith et al. | 340/998 |
| 2003/0013449 A1 | 1/2003 | Hose et al. | 455/440 |
| 2003/0023489 A1 | 1/2003 | McGuire et al. | 705/14 |
| 2003/0026268 A1 | 2/2003 | Navas | 370/400 |
| 2004/0076279 A1 | 4/2004 | Taschereau | 379/218.01 |
| 2004/0080452 A1 | 4/2004 | Percy et al. | 342/357.07 |
| 2004/0083133 A1 | 4/2004 | Nicholas et al. | 705/14 |
| 2004/0110515 A1 | 6/2004 | Blumberg et al. | 455/456.1 |

FOREIGN PATENT DOCUMENTS

| | | |
|---|---|---|
| GB | 2 368 990 | 5/2002 |
| WO | WO 00/49530 | 8/2000 |

* cited by examiner

FIG. 10

MARKET RESEARCH DATABASE 398

MARKET RESEARCH INFORMATION DATA 400

:

MARKET RESEARCH INFORMATION DATA RECORD 410

MARKET RESEARCH ID 410(1)

ADVERISING ZONE ID 410(2)

TIME RECORD 410(3)

NUMBER OF END USERS 410(4)

END USER RECORDS 410(5)

USER ID

USER ID

:

US 7,092,964 B1

METHOD OF COLLECTING MARKET RESEARCH INFORMATION

This application is a continuation-in-part of application Ser. No. 09/887,198 file Jun. 22, 2001.

BACKGROUND OF THE INVENTION

The present invention relates to a method of collecting market research information of mobile consumers moving through a geographic region.

Persons who travel through a geographic region can use different types of mobile or portable computing platforms to obtain various geographically-related features and services. Mobile or portable computing platforms that provide geographically-related features and services include dedicated computing devices and general purpose computing devices. Dedicated computing devices include in-vehicle navigation systems and personal (i.e., portable or hand-held) navigation systems. General purpose computing devices include devices, such as portable personal computers (e.g., notebook computers) and personal digital assistants (e.g., PDAs). General purpose computing devices can provide geographically-related features and services by operating navigation application software or by using geographic data. Mobile or portable computing platforms that provide geographically-related features and services include standalone systems that have geographic data and navigation application software installed locally, client devices that access geographic data or navigation application software located at a remote location, and hybrid devices that have some geographic data or navigation application software installed locally but obtain or use geographic data or navigation application software located at a remote location.

Some of the various geographically-related features and services provided by the different types of mobile or portable computing platforms include route calculation and guidance. For example, some mobile or portable computing platforms are able to provide users with an optimum route to travel by roads between locations in a geographic region. Using input from an end user, and optionally from equipment that can determine the end user's physical location (such as a GPS system), a navigation application program used by a mobile or portable computing platform system examines various paths between two locations to determine an optimum route to travel from a starting location to a destination location in the geographic region. The user of the mobile or portable computing platform is then provided with information about the optimum route in the form of instructions that identify the maneuvers required to be taken by the end user to travel from the starting location to the destination location.

Another geographically-related feature provided by some mobile or portable computing platforms is business or person finding services (e.g., electronic yellow or white pages). These services can identify addresses of individuals or businesses. These services can also identify for a user which businesses of a certain type (e.g., Chinese restaurants) are located within a given range (e.g., 3 miles) of a given location.

Although present mobile or portable computing platforms that provide geographically-related features and services are able to provide many useful advantages, there continues to be room for improvement. One area in which there is room for improvement relates to the collection of market research information. Traditional market research techniques have shortcomings of being very labor intensive and/or unable to provide accurate demographic information. For example, the market research technique of manually counting vehicles or pedestrians passing a point is a very time consuming process. Additionally, the market research technique measuring the number of vehicles that cross a pressure hose stretched across a road can only be associated with the demographics of the people living near the monitored road. Thus, there is a need for improvement in the collection of market research information.

SUMMARY OF THE INVENTION

A method of collecting market research information is disclosed. A geographic database contains data entities that represent geographic features, such as roads, located in a geographic region. Advertising zones are defined within the geographic region. Users of mobile computing platforms are provided with geographically-related services that use the geographic database. As users of the mobile computing platforms travel in the geographic region, the locations of the mobile computing platforms are determined. Demographic information of the mobile computing platform is associated with the position of the mobile computing platform. A market research record identifies which of the mobile computing platforms are located within or passing through one of the advertising zones.

BRIEF DESCRIPTION OF THE DRAWINGS

FIG. 10 is a block diagram showing a market research information data record contained in the market research database of FIG. 9

DETAILED DESCRIPTION OF THE PRESENTLY PREFERRED EMBODIMENTS

I. The Geographic Map Database

Figure 1:
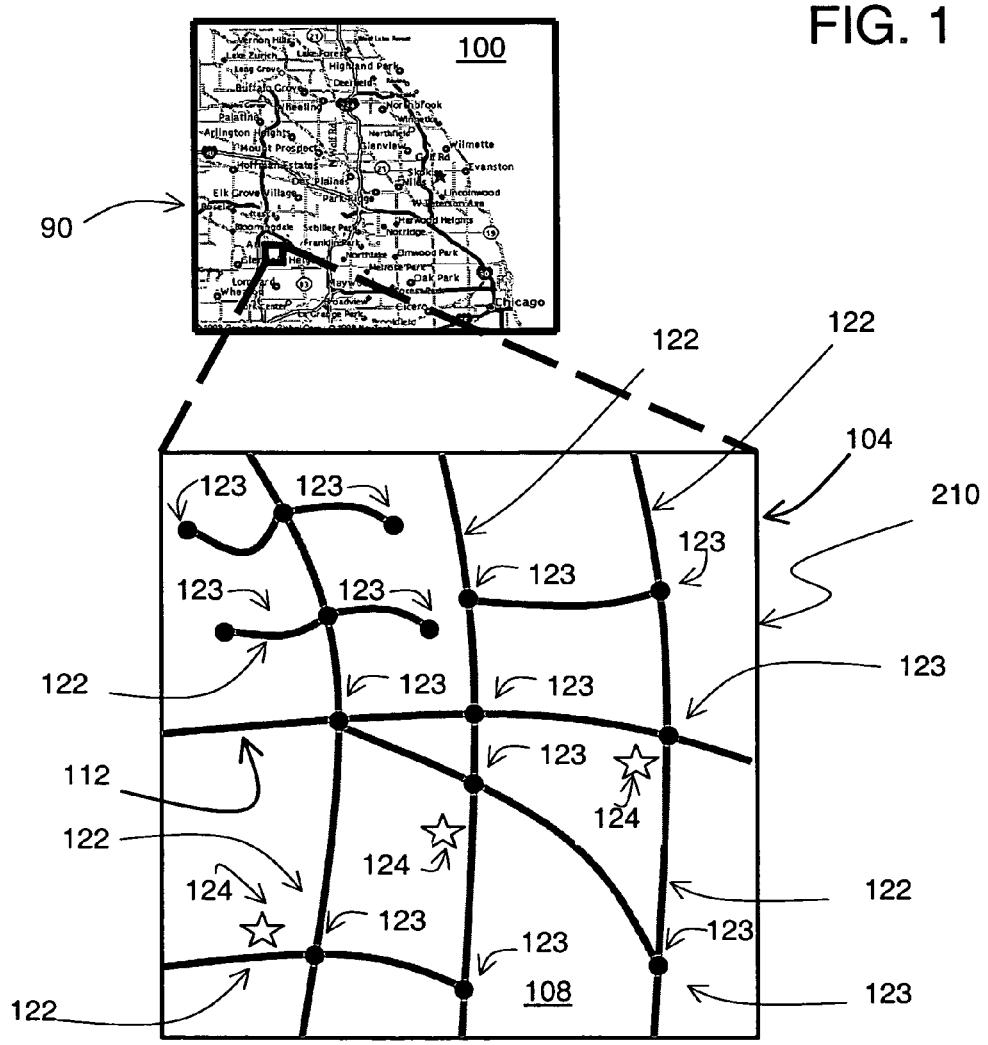
FIG. 1 shows a map of a geographic region and is used to describe an embodiment for organizing the data representing the geographic features located in the geographic region.

FIG. 1 shows a map 90 of a geographic region 100. The geographic region 100 may correspond to a metropolitan or rural area, a state, a country, or combinations thereof, or any other area of comparable size. Located in the geographic region 100 are physical features, such as roads, points of interest (including businesses, municipal facilities, etc.), lakes, rivers, railroads, municipalities, etc.

FIG. 1 also includes an enlarged map 104 of a portion 108 of the geographic region 100. The enlarged map 104 illustrates part of the road network 112 in the geographic region 100. The road network 112 includes, among other things, roads and intersections located in the geographic region 100. As shown in the portion 108, each road in the geographic region 100 is composed of one or more road segments 122. A road segment 122 represents a portion of the road. Each road segment 122 is shown to have associated with it two nodes 123: one node represents the point at one end of the road segment and the other node represents the point at the other end of the road segment. The node at either end of a road segment may correspond to a location at which the road meets another road, e.g., an intersection, or where the road dead-ends.

Figure 2:
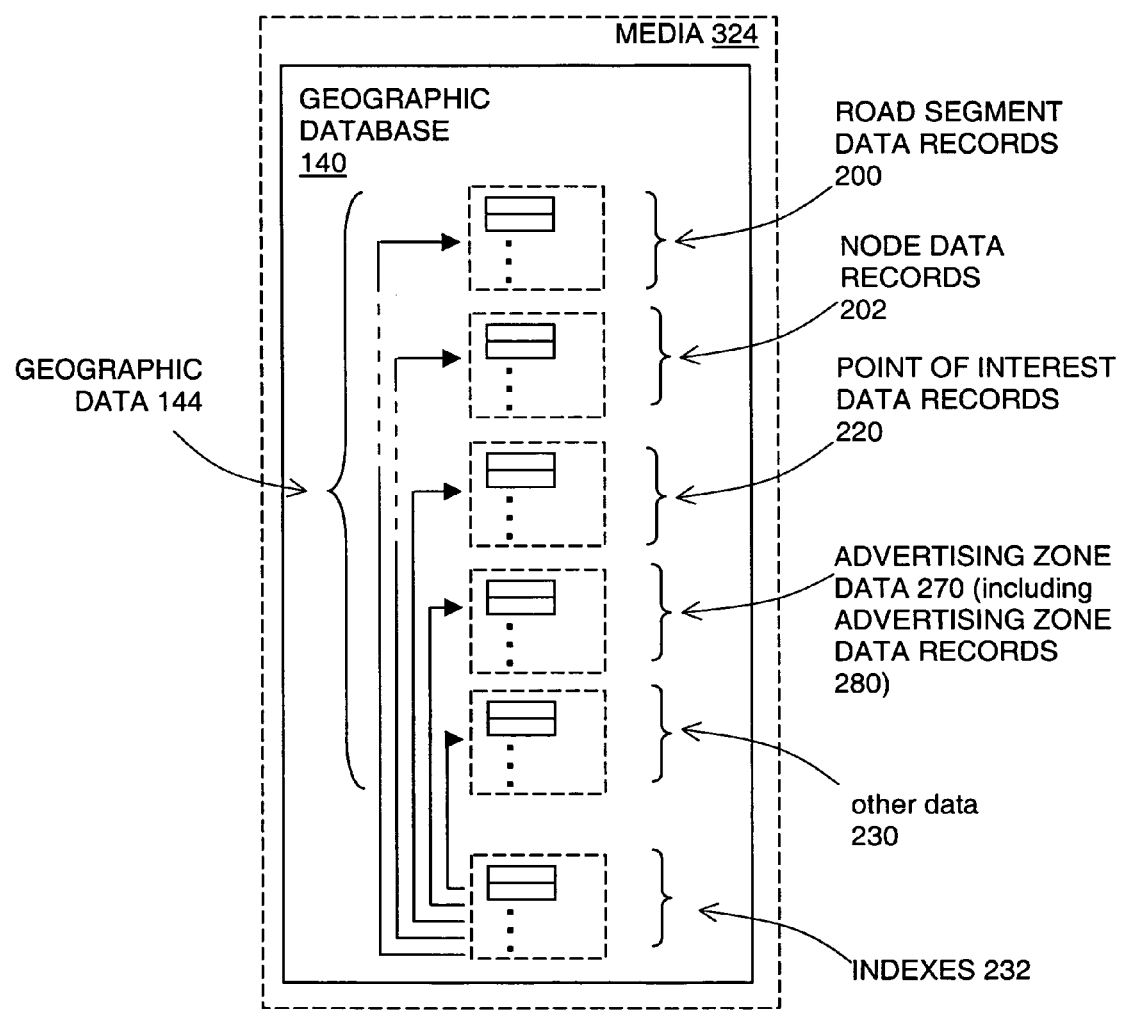
FIG. 2 is a block diagram of a geographic database that represents the geographic region of FIG. 1.

Referring to FIG. 2, a geographic database 140 contains data 144 that represents some of the physical features in the geographic region (100 in FIG. 1). The data 144 contained in the geographic database 140 includes data that represent the road network. In the embodiment of FIG. 2, the geographic database 140 that represents the geographic region 100 contains at least one database record (also referred to as "entity" or "entry") for each road segment 122 in the geographic region (100 in FIG. 1). In the geographic database 140 that represents the geographic region 100, there is also a database record (or "entity" or "entry") for each node 123 in the geographic region 100. (The terms "nodes" and "segments" represent only one terminology for describing these physical geographic features and other terminology for describing these features is intended to be encompassed within the scope of these concepts.)

Figure 3:
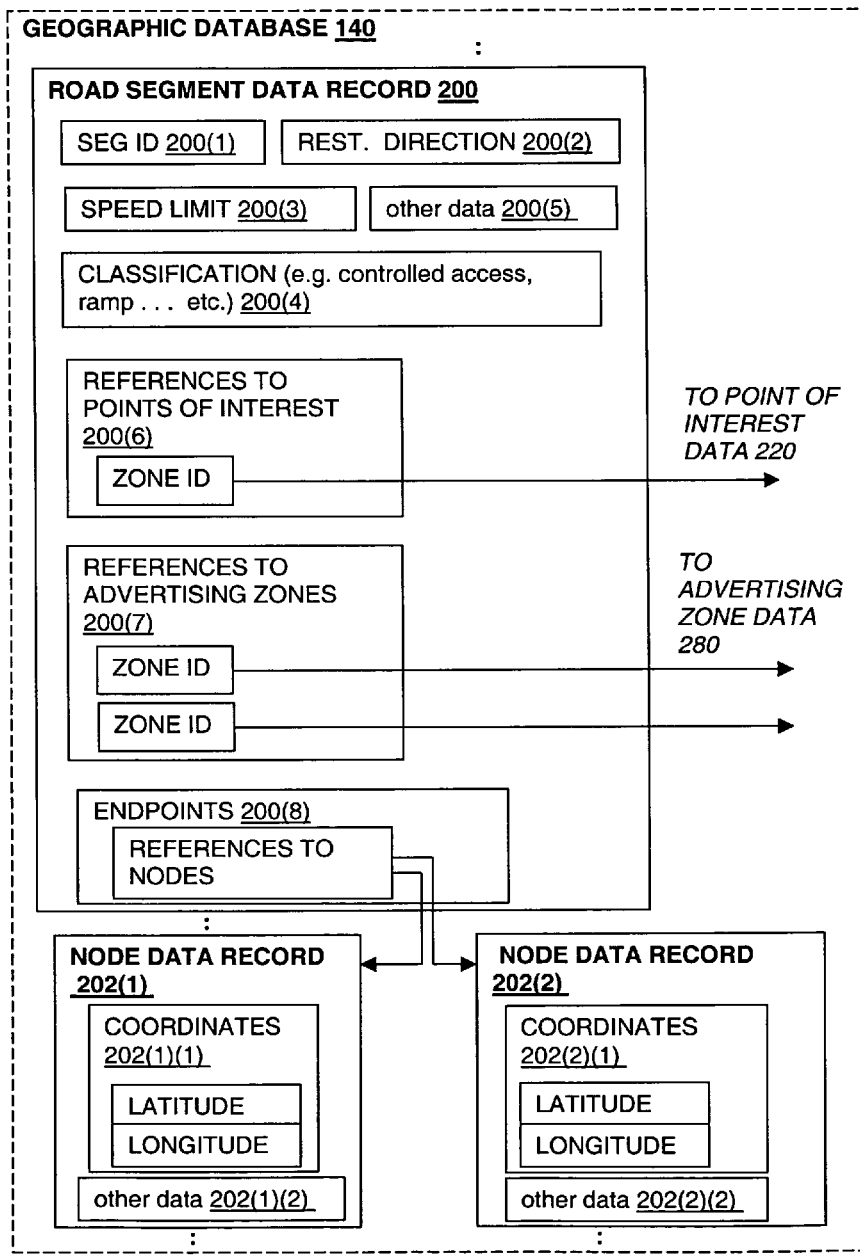
FIG. 3 is a block diagram showing a road segment data record contained in the geographic database of FIG. 2.

FIG. 3 shows some of the components of a road segment data record 200 contained in the geographic database 140. The road segment record 200 includes a segment ID 200(1) by which the data record can be identified in the geographic database 140. Each road segment data record 200 has associated with it information (such as "attributes", "fields", etc.) that describes features of the represented road segment. The road segment data record 200 may include data 200(2) that indicate the restrictions, if any, on the direction of vehicular travel permitted on the represented road segment. The road segment data record 200 includes data 200(3) that indicate a speed limit or speed category (i.e., the maximum permitted vehicular speed of travel) on the represented road segment. The road segment data record 200 may also include data 200(4) indicating whether the represented road segment is part of a controlled access road (such as an expressway), a ramp to a controlled access road, a bridge, a tunnel, a toll road, a ferry, and so on.

The road segment data record 200 also includes data 200(8) providing the geographic coordinates (e.g., the latitude and longitude) of the endpoints of the represented road segment. In one embodiment, the data 200(8) are references to the node data records 202 that represent the nodes corresponding to the endpoints of the represented road segment.

The road segment data record 200 may also include or be associated with other data 200(5) that refer to various other attributes of the represented road segment. The various attributes associated with a road segment may be included in a single road segment record, or may be included in more than one type of record which are cross-referenced to each other. For example, the road segment data record 200 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 202 may have associated information (such as "attributes", "fields", etc.) that allows identification of the road segment(s) that connect to it and/or its geographic position (e.g., its latitude and longitude coordinates). For the embodiment shown in FIG. 3, the node data records 202(1) and 202(2) include the latitude and longitude coordinates 202(1)(1) and 202(2)(1) for their node. The node data records 202(1) and 202(2) also include other data 202(1)(2) and 202(2)(2) for their node.

Referring to FIG. 1, the portion 108 of the geographic region 100 includes points of interest 124. Points of interest include businesses, municipal buildings, historical markers, buildings, specifically designated geographic locations, etc. In one embodiment, the geographic database 140 contains data that represent the points of interest 124. As shown in FIG. 2, the geographic database 140 contains point of interest data 220. The point of interest data 220 represent the various points of interest 124 located in the geographic region 100. The points of interest data 220 include point of interest data records 222.

Figure 4:
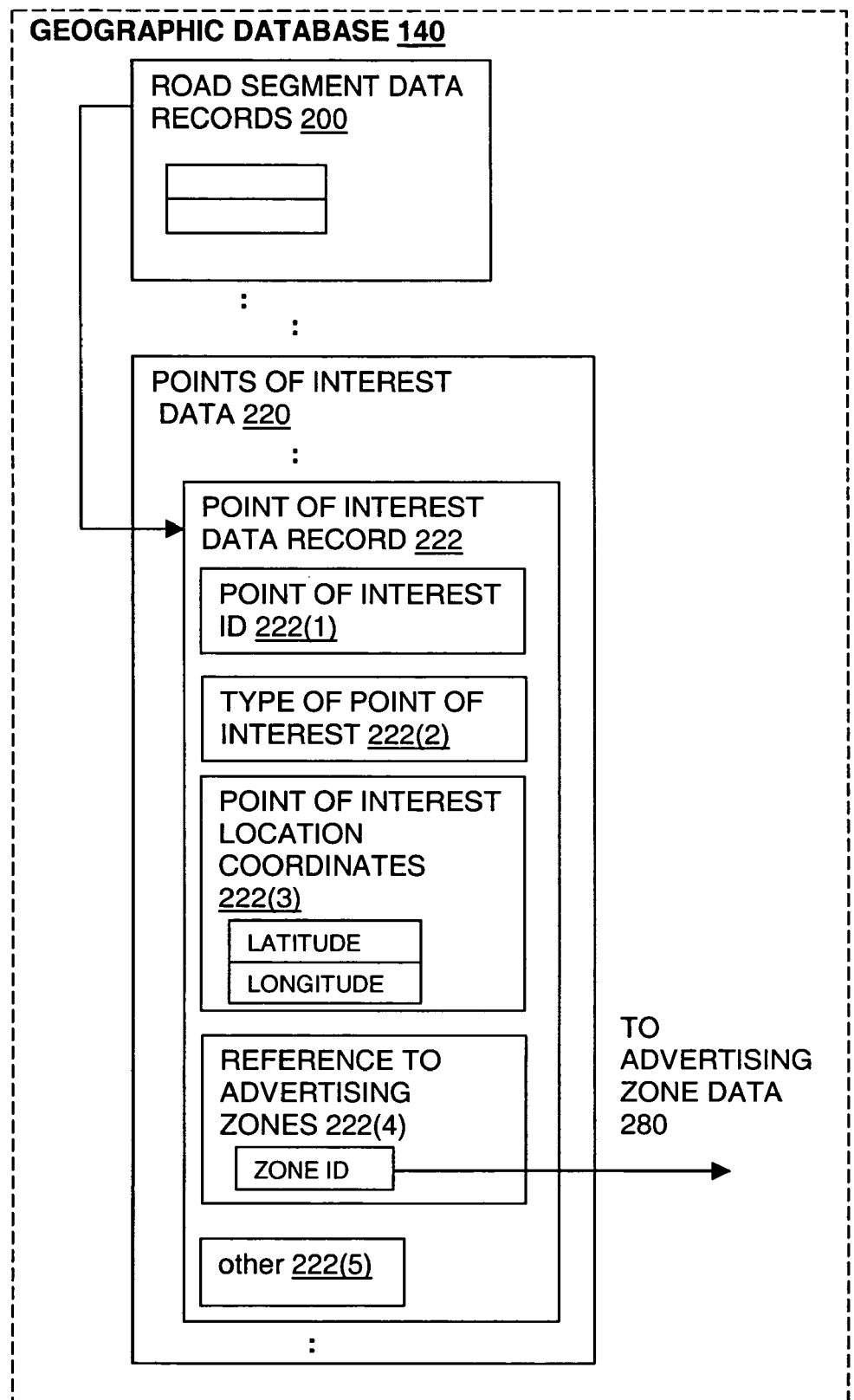
FIG. 4 is a block diagram showing a point of interest data record contained in the geographic database of FIG. 2.

FIG. 4 shows some of the components of a point of interest data record 222 contained in the geographic database 140. The point of interest data record 222 includes a point of interest ID 222(1) by which the data record can be identified in the geographic database 140. Each point of interest data record 222 has associated with it information (such as "attributes", "fields", etc.) that describes features of the represented point of interest. The point of interest data record 222 may include data 222(2) that indicates a type (e.g., the type of point of interest, such as restaurant, hotel, city hall, police station, historical marker, ATM, golf course, etc.). The point of interest data record 222 may also include data 222(3) providing the geographic coordinates (e.g., the latitude and longitude) of the represented point of interest.

The point of interest data record 222 may also include or be associated with other data 222(5) that refer to various other attributes of the represented point of interest. The various attributes associated with the point of interest may include a phone number, hours of operation, etc. Referring to FIG. 3, the road segment data record 200 includes data 200(6) that identifies the point(s) of interest 220 located on the represented road segment. In the embodiment of FIG. 3, data 200(6) that identifies the point(s) of interest 220 refers to the point of interest data record(s) 222 that represent the point(s) of interest 124 located on the represented road segment.

The geographic database 140 may also include other kinds of data 230. The other kinds of data 230 may represent other kinds of geographic features or anything else. The geographic database 140 also includes indexes 232. The indexes 232 may include various types of indexes that relate the different types of data to each other or that relate to other aspects of the data contained in the geographic database 140.

II. Advertising Zones

Figure 5:
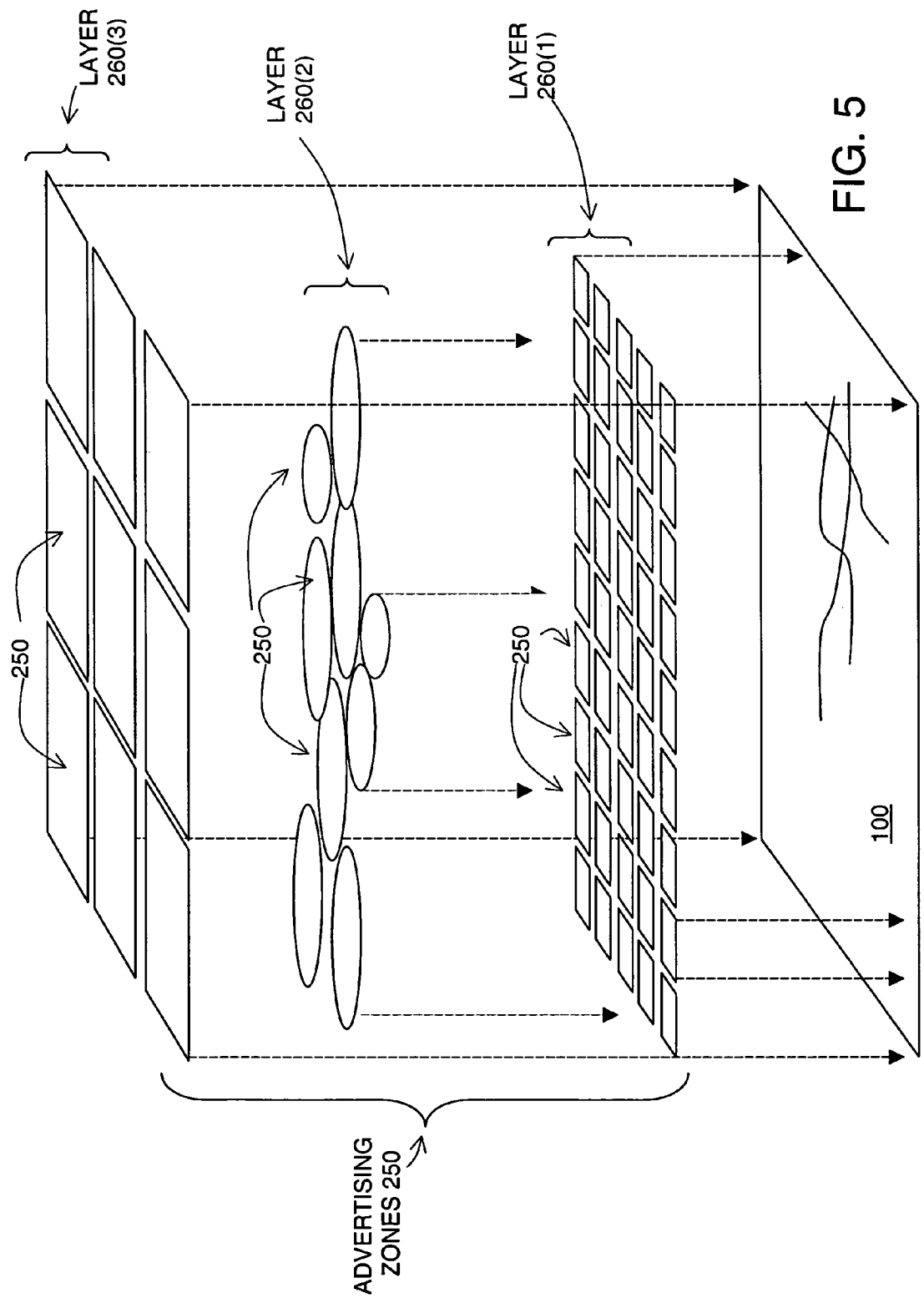
FIG. 5 illustrates formation of advertising zones within the geographic region of FIG. 1.

FIG. 5 shows a perspective view of the geographic region 100. In a present embodiment, the developer of the geographic database 100 defines a plurality of advertising zones 250 within the geographic region 100. The term advertising zone is used for convenience and is not intended to be limited for the purpose of advertising but rather the zones may be used for any other purpose. The advertising zones may also be referred to as location referencing zones, location referencing entities, marketing zones, emergency warning zones, traffic zones, etc. The advertising zones are defined as bounded areas located within the geographic region 100. The advertising zones 250 may be all the same size and shape. Alternatively, as shown in FIG. 5, the advertising zones 250 may be different sizes and/or shapes.

In the embodiment of FIG. 5, the advertising zones are defined in separate layers 260(1), 260(2) . . . 260(n). Each layer includes a separate plurality of advertising zones. The advertising zones defined in one layer may overlap the advertising zones defined in another of the layers. Within a layer, each advertising zone may be distinct from every other advertising zone within the layer, i.e., within a layer, advertising zones do not overlap. Alternatively, advertising zones within a layer may overlap to some extent. Also, the advertising zones within a layer may be coextensive with the entire geographic region or alternatively, the advertising zones within a layer may not be coextensive with the entire geographic region, i.e., there may be locations within the geographic region that are not encompassed within an advertising zone.

The sizes of the advertising zones and the boundaries of the advertising zones are determined so that each advertising zone has an appropriate size and boundaries for targeted advertising. Different types of businesses have different kinds of advertising requirements. As an example, a fast food restaurant in an urban area may want to advertise within a three mile area around the location of the restaurant, but not beyond three miles because it is unlikely that many consumers would travel more than three miles to get to the restaurant. On the other hand, a department store may want to advertise within 20 miles of its location, but not beyond 20 miles. Thus, different sizes of advertising zones are provided for different kinds of businesses.

Each of the different layers of advertising zones may be identified by zone type. Various different types of advertising zone may be defined.

There are other considerations that can affect the sizes and boundaries of the advertising zones. One consideration is premium advertising. For example, a business, such as a restaurant, may want to be an exclusive advertiser for a certain area. Another consideration is balance. If too many businesses of the same type advertise in a certain area, the value of the advertising diminishes. Another consideration is population density. Persons in sparsely populated areas may be willing to drive further to get to the locations of businesses than persons in densely populated areas. Accordingly, advertising zones in sparsely populated areas may be larger, in general, than corresponding advertising zones in densely populated areas.

Because the sizes of the advertising zones are determined based on appropriate sizes for targeted advertising, the boundaries of advertising zones do not necessarily correspond to the boundaries of cities, towns, counties, etc. Likewise, the boundaries of advertising zones do not necessarily correspond to the rectangular areas defined for data parcels (as described in U.S. Pat. No. 5,974,419).

Referring to FIG. 2, the geographic database 140 that represents the geographic region (100 in FIG. 1) includes advertising zone data 270. The advertising zone data 270 represent the advertising zones (250 in FIG. 4) that have been defined by the geographic database developer for the region (100 in FIG. 1). In a present embodiment, the advertising zones 250 are represented by advertising zone data records 280. In this embodiment, each advertising zone 250 is represented by an advertising zone data record 280.

Figure 6:
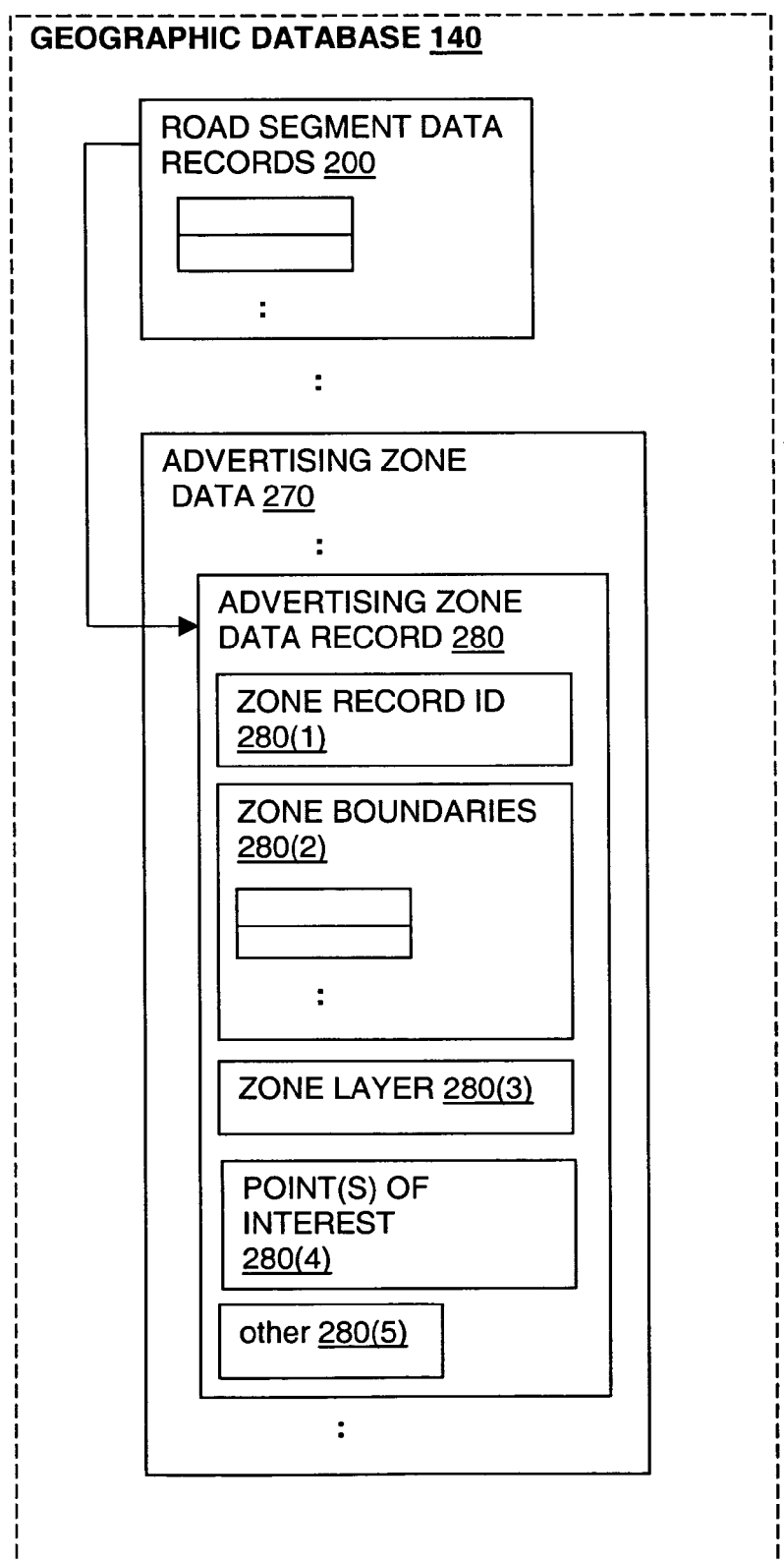
FIG. 6 is a block diagram showing an advertising zone data record contained in the geographic database of FIG. 2.

FIG. 6 shows components of an advertising zone data record 280. An advertising zone data record 280 includes a zone record ID 280(1) by which the advertising zone data record is identified in the geographic database 140. In addition, the advertising zone data record 280 includes attributes that describe the represented advertising zone. In FIG. 6, the advertising zone data record 280 includes zone boundary data 280(2). The boundary data 280(2) indicate the boundaries of the represented advertising zone. The zone boundary data 280(2) may include the geographic coordinates of the boundaries. Alternatively, the zone boundary data 280(2) may include a radius from a point of interest, such as a restaurant. According to another alternative, the zone boundary data 280(2) may be defined in terms of the geographic database structure, e.g., in terms of parcel boundaries. According to yet another alternative, the zone boundary data 280(2) may be defined in terms of geographic features, e.g., streets, rivers, etc. The zone boundaries may also be defined in terms of the road segments included within the advertising zone. The zone boundary data 280(2) may include any type of information that sufficiently defines the boundaries of the represented advertising area. For example, the zone boundary data may include data relating to a driving distance and/or travel time from a location, such as a point of interests. Additionally, the zone boundary data may include a direction of travel for defining the zone boundaries.

The advertising zone data record 280 also includes a zone layer ID 280(3). The zone layer ID 280(3) identifies the layer (260 in FIG. 5) in which the represented advertising zone is located. The advertising zone data record 280 may also include points of interest data 280(4) that identifies points of interest associated with represented advertising zone 250. In one embodiment, the points of interest associated with the represented advertising zone are businesses, such as restaurants and retail stores. A single point of interest may be within the represented advertising zone or many points of interest may be within the represented advertising zone. The points of interest data 280(4) may include location information for the points of interest, such as latitude and longitude coordinates or address information. The points of interest data 280(4) may also include data that refers to the point of interest data records 222 for the represented point of interest 124. The advertising zone data record 280 may also include other data 280(5).

Referring to FIG. 3, the road segment data record 200 includes data 200(6) that identifies the advertising zone(s) 250 in which the represented road segment is located. In the embodiment of FIG. 3, data 200(6) that identifies the advertising zone(s) 250 refers to the advertising zone data records 280 that represent the advertising zones 250 in which the represented road segment is located. Referring to FIG. 4, the point of interest data record 222 includes data 222(4) that identifies the advertising zone(s) 250 in which the represented point of interest is located. In the embodiment of FIG. 4, data 222(4) that identifies the advertising zone(s) 250 refers to the advertising zone data records 280 that represent the advertising zones 250 in which the represented point of interest is located.

Figure 7:
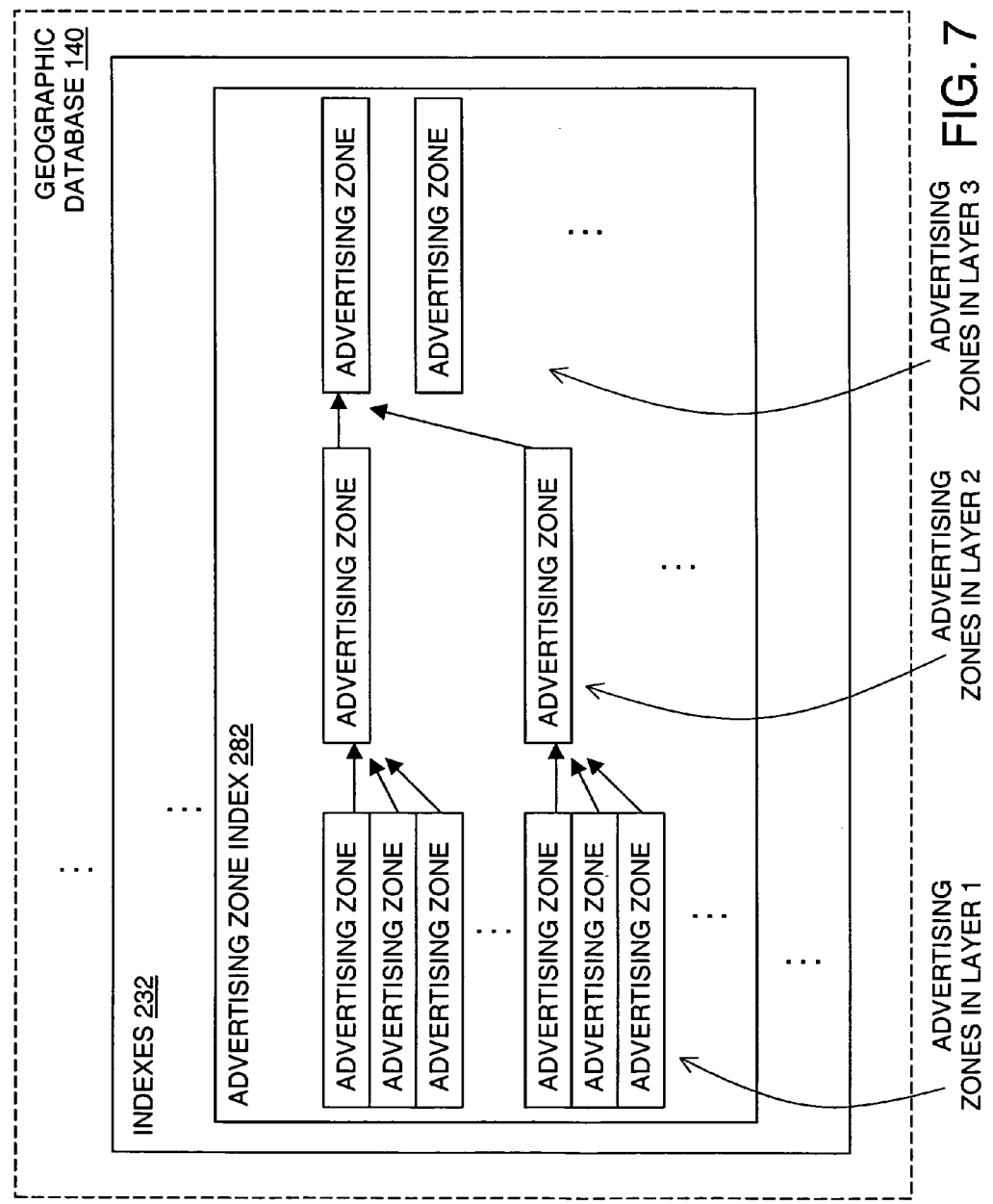
FIG. 7 is a block diagram showing an advertising zone index contained in the geographic database of FIG. 2.

As mentioned above, advertising zones 250 may be organized in layers 260. The relationship between the advertising zones in one layer and the advertising zones in another layer may be represented in an index. Referring to FIG. 7, according to one embodiment, the geographic database 140 includes an advertising zone index 282. The advertising zone index 282 is included in the geographic database 140 among the indexes 232. The advertising zone index 282 indicates relationships between advertising zones in different layers. The advertising zone index 282 may indicate which advertising zones in different layers correspond to the same areas. For an advertising zone in one layer, the advertising zone index may indicate which advertising zone(s) in another layer overlaps the advertising zone.

III. Navigation System

As mentioned above, there are various different kinds of mobile or portable computing platforms that provide geographically-related features and services. One embodiment of a navigation system is described in connection with FIG. 8.

Figure 8:
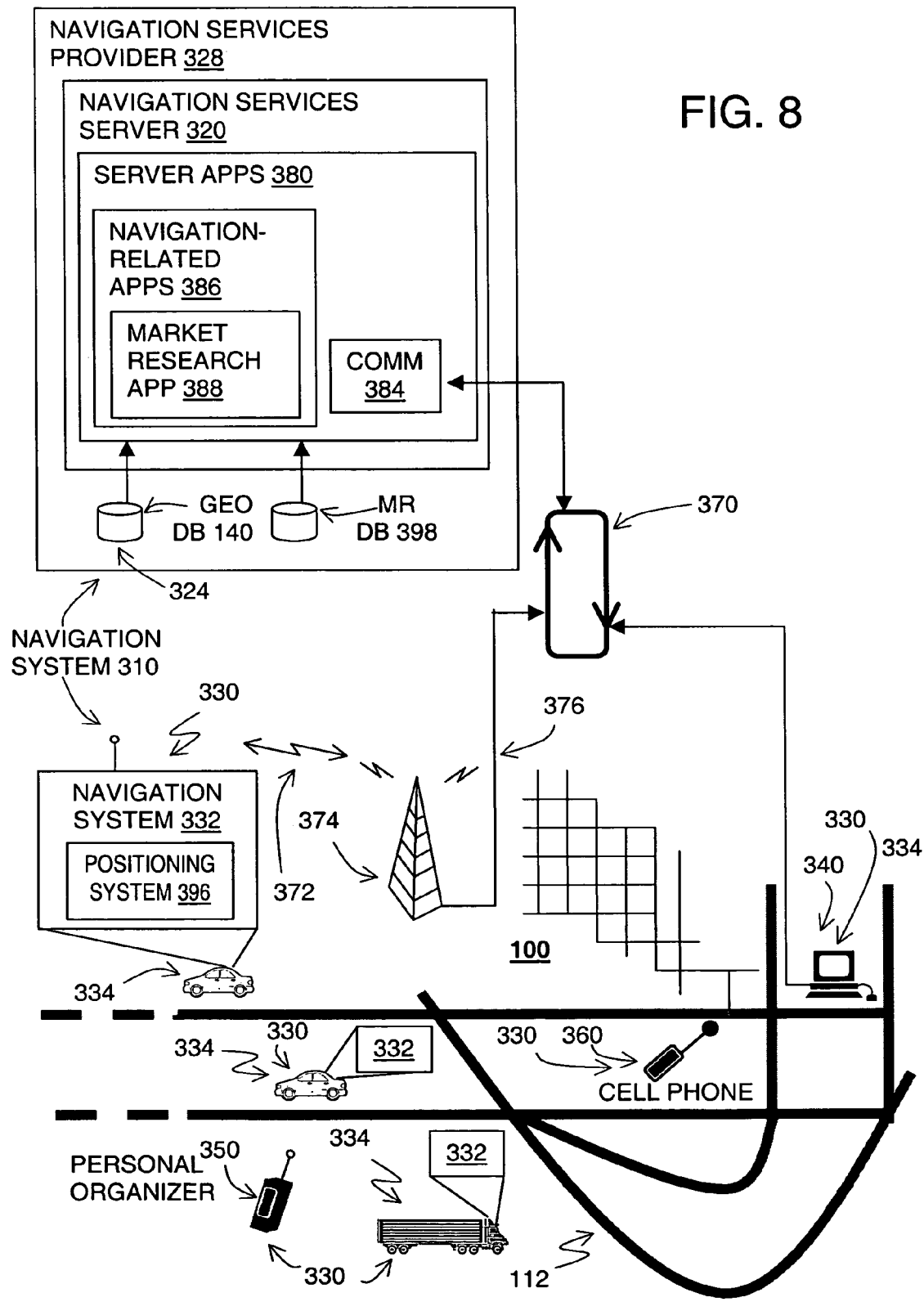
FIG. 8 is a diagram of a navigation system located in the geographic region of FIG. 1.

FIG. 8 shows the geographic region 100 and a portion of the road network 112. A navigation system 310 serves end users (e.g., vehicle drivers and passengers, as well as other persons) in the geographic region 100. The navigation system 310 is used by the end users to obtain navigation-related services (including map-related services) with respect to the geographic region 100. The navigation-related services include information about travel along the road network 112, including route calculation and guidance, people and business finding services (e.g., electronic yellow and white pages), maps, point of interest searching, destination selection, and so on.

The navigation system 310 is a combination of hardware, software and data. The navigation system 310 includes remote components (i.e., hardware, software or data located at a central location that is remote from the end users) and local components (i.e., hardware, software, or data located physically with each end user).

Included among the remote components of the navigation system 310 is a navigation services server 320. The navigation services server 320 includes appropriate computer hardware and software to run network applications. The navigation services server 320 is maintained and operated by a navigation services provider 328.

Associated with the navigation services server 320 is the geographic database 140. The geographic database 140 is stored on a storage medium 324 that is accessible to the navigation services server 320. The storage medium 324 may include one or more hard drives or other storage media. The geographic database 140 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein. In one embodiment, the geographic database 140 is developed by Navigation Technologies Corporation of Chicago, Ill. However, it is understood that the inventive concepts disclosed herein are not restricted to any particular source of data.

The local components of the navigation system 310 include the various computer platforms 330 operated by the end users to request and obtain navigation-related and map-related features and geographic data from the navigation services provider 328. These various computer platforms 330 (also referred to as "end user computing platforms" or "client computing platforms") may include navigation system units 332 located in vehicles 334, personal computers 340, personal organizers (e.g., PDAs, PalmPilot®-type devices) 350, wireless phones 360, or any other types of computing devices that have the appropriate hardware and software to access the navigation services provider 328 over a data network 370.

Referring to the embodiment of FIG. 8, some of the end user computing platforms 330 include positioning equipment 396. The positioning equipment 396 may include a GPS system, inertial sensors, wheel pulse sensors, etc. Using this positioning equipment 396, the position of the end user's computing platform 330 can be determined. Methods for determining position are disclosed in U.S. Pat. No. 6,192,312, the entire disclosure of which is incorporated by reference herein.

The data network 370 may use any suitable technology and/or protocols that are currently available, as well as technology and/or protocols that become available in the future. For example, the data network may use WAP, TCP/IP, etc. More than one protocol may be used in the data network 370 with appropriate conversions. The data network 370 may be part of, or connected to, the Internet.

A portion of the network 370 may include a wireless portion 372. The wireless portion 372 of the data network 370 enables two-way communication between the mobile end user computing platforms 330 and the service provider 328. The wireless portion 372 may be implemented by any suitable form of wireless communication, including cellular, PCS, satellite, FM, radio, or technologies that may be developed in the future. The wireless portion 372 may include one or more transmitters 374, such as a transponder tower, an antenna tower, an FM tower, satellites, or other suitable means. The transmitters 374 include an appropriate communication link 376 to the network 370 and/or service provider 328. This link 376 may be land-based or may be wireless. The transmitters 374 include suitable technology that enables two-way communication between the service provider 328 and the mobile end user computing platforms 330.

The navigation system 310 of FIG. 8 can accommodate different types of end user computing platforms 330. The navigation system 310 of FIG. 8 allows end users who have different types of computing platforms 330 to obtain navigation services from the navigation services provider 328 and to obtain and use geographic data provided from the navigation services provider 328. Using data that indicate the end user's positions from the position equipment 396 of the end user computing platforms 330, the navigation services server 320 may provide navigation-related services with respect to the geographic region 100.

Referring to FIG. 8, server applications 380 are included on the navigation services server 320 of the navigation services provider 328. The server applications 380 may be stored on one or more hard drive(s) or other media operated by the server 320 and loaded into a memory of the server 320 to run. One of the server applications 380 is a communications application 384. The communications application 384 interfaces with the data network 370 in order to receive messages from and send messages to the end users.

Included among the server applications 380 are navigation-related applications 386. The navigation-related applications 386 use the geographic database 140 associated with the navigation services server 320 in order to provide the various different types of navigation-related services. In order to provide navigation-related features, the navigation-related applications 386 use data from the geographic database 140.

One of the navigation-related applications 386 is a route calculation application. End users may access the navigation services provider 328 to obtain a route from an origin to a destination. The route calculation application determines the route for the end user to travel along the road network (112 in FIG. 1) to reach the desired destination. In order to calculate a route, the route calculation application is provided with data identifying a starting location (origin) and a desired destination location. In one embodiment, the starting location may be the end user's current position and the destination location may be a point of interest. The data used to identify the location of the point of interest may include information from the geographic database 140, such as the geographic coordinates of the point of interest, the street addresses of the point of interest, the name of the point of interest or a specification of the data entity in the geographic database 140 that represents the road segments upon which the point of interest is located. The starting location may be provided by the positioning equipment 396 of the end user's computing platform.

Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, it accesses the geographic database 140 and obtains data that represent road segments around and between the starting location and the destination location. The road calculation application uses the data to determine at least one valid solution route from the starting location to the destination location.

In one embodiment, the route calculation application may attempt to find a solution route that takes the least time to travel. Each of the road segment data records 200 of the geographic database 140 has an associated default segment cost or travel time for the particular represented road segment. The segment cost or travel time for the particular represented road segment considers the type of road, such as freeway or residential street, speed limit and distance of the segment. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

In one embodiment, the route calculation application may consider traffic conditions to more accurately reflect actual travel time over the connected road segments and to select the quickest route. Travel times on a selected road segment may vary at certain times of the day, such as during rush hour. The route calculation application may consider the time of day and historic traffic patterns to adjust the travel time on the selected road segment. For example, the route calculation application may increase the default travel time associated with the selected road segment by thirty percent to reflect rush hour traffic conditions. In addition, the route calculation application may increase the default travel time associated with the selected road segment by a prescribed percentage based on road conditions, such as rain. The historic traffic information may be included in the road segment data records 200 of the geographic database 140. The navigation services provider 328 may provide the time of day and weather condition information to the navigation services server 320.

Furthermore, the route calculation application may consider real-time traffic information (RTTI) to more accurately reflect actual travel time over the connected road segments and to select the quickest route. The RTTI can be traffic congestion information. One way to gather RTTI is with sensors placed on the road segments to measure traffic flow. The sensors provide the traffic flow data to the navigation services server 320. Additionally, some RTTI is publicly available from various state and local government agencies. For example, the Illinois Department of Transportation provides road segment travel time reflecting traffic conditions at a publicly accessible website. Such information can be used by the navigation services sever 320 to update the current travel times for road segments. The route calculation application may use the current travel times for the various road segments to calculate the fastest route and more accurate estimated route travel time. Methods for using real-time traffic information are disclosed in U.S. patent application Ser. No. 09/196,409, entitled "Method and System for Using Real-Time Traffic Broadcasts With Navigation Systems, filed Nov. 19, 1998, the entire disclosure of which is incorporated by reference herein.

Another of the navigation-related applications 386 on the navigation services server 320 is a route guidance application. The route guidance application uses the output from the route calculation application to provide maneuver instructions for the end user to travel to the desired destination on the calculated route. The route guidance application generates an output comprised of a series of maneuvers derived from the list of road segments provided in the output of the route calculation application. The output of the route guidance application is provided to the end user through an user interface included on the computing platform 330. The output of the route guidance may be conveyed audibly through speech synthesis or on a visual display. Using data that indicate the end user's positions, the route guidance application on the navigation services server 320 determines the appropriate times and locations at which to provide maneuvering instructions. The route guidance maneuvers instruct the end user to turn in a specified direction at specified nodes connecting road segments of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

IV. Collecting Market Research Information

The navigation services provider (328 in FIG. 8) enters into agreements with market researchers or advertisers to collect location-based market research information. The agreements provide that market research information will be collected based on the advertising zone(s). A market researcher can choose to collect information regarding end users located in only a single advertising zone. The market researcher can also choose to collect information regarding end users located in several advertising zones. The agreements may also provide that market research information will be collected for advertising zone created based on previously collected information.

In one embodiment, the market researcher specifies the location and size of the advertising zone. For example, the market researcher may specify an advertising zone comprising a radius surrounding a certain point of interest, such as a restaurant. In another example, the market researcher may specify an advertising zone comprising a single road segment passing by the point of interest. In a further example, the market researcher may specify an advertising zone comprising a portion of a single road segment passing by a physical billboard, such as a one way portion of a two-way road segment.

There are various alternative ways that advertising zones may be used to collect location-based market research information. The agreement between the navigation services provider 328 and the market researcher may specify to count the number of users located within the advertising zone at specified times, such as 11:30 AM and 5:00 PM. The agreement between the navigation services provider 328 and the market researcher may also specify to count the number of users passing through the advertising zone during a specified time period, such as between 6:00 AM and 6:00 PM. The agreement between the navigation services provider 328 and the market researcher may specify a duration of time (e.g., one month) to count the presence and/or movement of users through the selected advertising zone.

Moreover, the agreement between the navigation services provider 328 and the market researcher may specify certain demographic information be collected regarding the end users associated with the advertising zones. Desired demographic information may be information regarding the type of vehicle. The vehicle class, such as minivan, sport utility or luxury sedan, vehicle year, vehicle price, purchased or leased, and odometer reading may be included in the market research information. Other demographic information may be information regarding the end user. The age, sex, family information, income, education level, employment status, and residential address of the end user may be included in the market research information. Additionally, information regarding the trip taken by the end user may be included in the market research information, such as duration of the trip, origin and destination, distance traveled, speed traveled and specific route taken. Furthermore, preferential information of the end user may be included in the market research information. The end user may register with the navigation services provider 328 personal preference information, such as preferred restaurant and retail franchises, interests, activities, purchasing habits and favorite entertainment.

Referring to FIG. 8, the market research information collected is stored in an market research database 398 associated with the navigation services server 320. The market research database 398 may be located on the same media as the geographic database 140 or may be on another media. The market research database 398 contains at least one database record of market research information collected by the navigation services provider 328.

Figure 9:
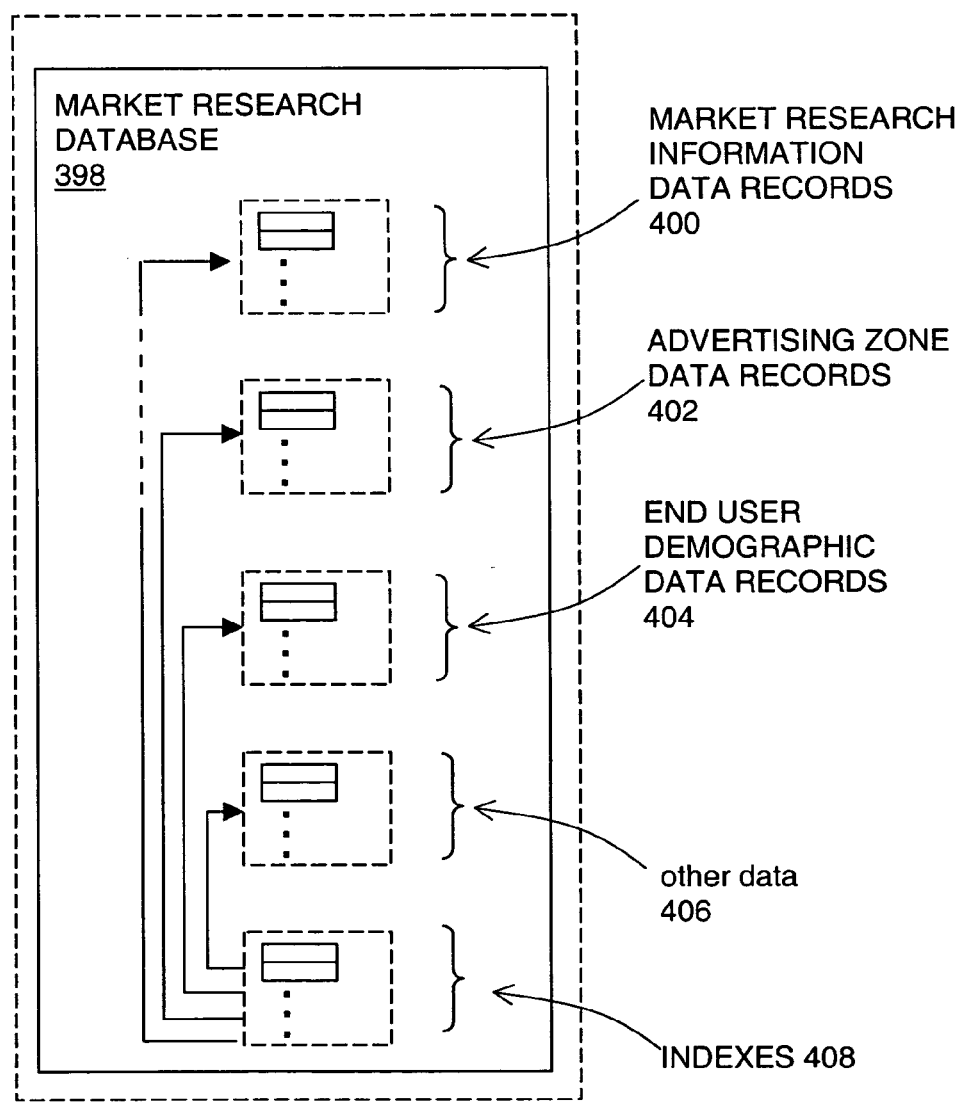
FIG. 9 is a block diagram of a market research database.

FIG. 9 illustrates one embodiment for the market research database 398. The market research database 398 contains market research information data records 400. The market research database 398 also includes advertising zone data records 402. The advertising zone data records 402 identify the advertising zones for which market research information is collected. Each of the advertising zone data records 402 may contain a zone record ID by which the advertising zone data record is identified in the market research database 398. In addition, the advertising zone data record 402 includes attributes that describe the represented advertising zone. In one embodiment, the advertising zone data record 403 includes boundary data that indicates the boundaries of the represented advertising zone and layer data that indicates the layer of the represented advertising zone. The zone boundary data may identify the road segments included in the advertising zone. The advertising zone data record 402 may also include point of interest data that identifies the point of interest(s) associated with the represented advertising zone.

In one embodiment, the market research database 398 also includes end user demographic data records 404. The end user demographic data records 404 contain the demographic information for the end users. Each of the end user demographic data records 404 may contain an end user record ID by which the end user demographic data record 404 is identified in the market research database 398. In addition, the end user demographic data records 404 include the demographic information of the registered end user. Demographic information may include information regarding end user's vehicle, such as vehicle class, vehicle year, vehicle price, purchased or leased, and odometer reading. Other demographic information may be information regarding the age, sex, family information, income, education level, employment status, residential address or other information regarding the end user. The end user demographic data records 404 may also include personal preference information, such as preferred restaurant and retail franchises, interests, activities, purchasing habits and favorite entertainment. The end user demographic data records 404 may also include historical trip information, such as typical duration of trips, typical origins and destinations, typical distances traveled and typical speed traveled.

The market research database 398 may also include other kinds of data 406. The other kinds of data 406 may represent other kinds of information regarding market research information or anything else. The market research database 398 may also include indexes 408. The indexes 408 may include various types of indexes that relate the different types of data to each other or that relate to other aspects of the data contained in the market research database 398.

FIG. 10 shows some of the components of a market research information data 400 contained in the market research database 398. The market research information collected by the navigation services provider 328 is stored in the market research information data records 410. The market research information data record 410 includes a market research information ID 410(1) by which the data record can be identified in the market research database 398. Each market research information data record 410 identifies the advertising zone ID 410(2) for which the market research information has been collected. The market research information data record 410 includes data 410(3) that indicates a time record, such as the time of day or time period over which the market research information was collected. The market research information data record 410 also includes data 410(4) that records the number of end users within or passing through the advertising zone for the represented time record. Additionally, the market research data records 410 includes end user records 410(5) that identify each end user located in the advertising zone. Each end user record 410(5) may include the end user ID and/or demographic information regarding the end user.

V. Operation

Referring to FIG. 8, end users are located throughout and move about the geographic region 100. The end users use various means of transportation to move in the geographic region 100. For example, end users may use automobiles, trucks, buses, bicycles, motorcycles, trains, taxis, horses, and so on. End users may also move throughout the geographic region by foot. As the end users move throughout the geographic region, they use mobile or portable computing platforms 330 to obtain geographically-related services and features. The end users may communicate with the navigation services server 320 over the data network 370 to implement the geographic-related services and features.

Figure 11:
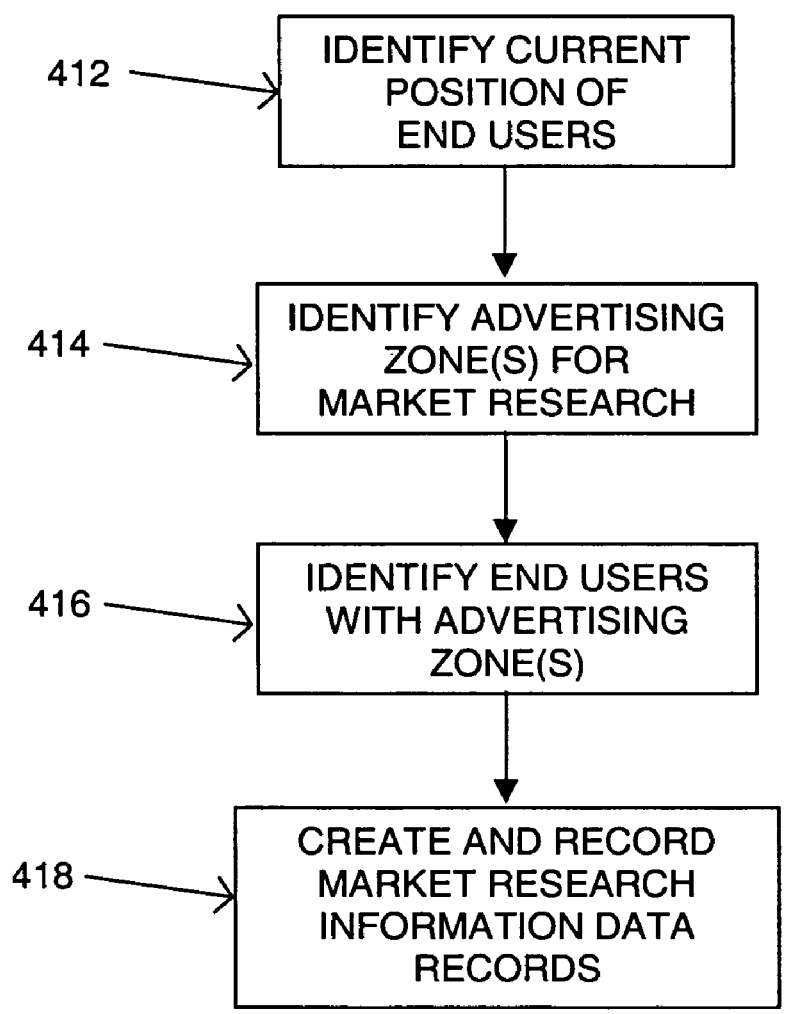
FIG. 11 is a flow chart of the operations of a navigation services server for collecting market research information.

While providing the geographic-related services and features to the end users, the navigation services provider 328 may collect location-based market research information. Included among the server applications 380 on the navigation services server 320 is a market research application 388 that collects location-based market research information. FIG. 11 is a flow chart of the operations of the navigation services server 320 for collecting location-based market research information according to one embodiment. In the embodiment of FIG. 11, market research information is collected based on the number of end users within the advertising zone(s) at specified times. As an end user travels through the geographic region 100, the navigation services server identifies the current position of the end users at step 412. The position of the end user may be determined by positioning equipment associated with the end user's computing platform (such as positioning system 396 in FIG. 8). The position of the end user may be determined by other methods. For example, the position of the end user may be determined by network-based location identification (e.g., emergency 911 services). The position of the end user may also be determined by obtaining the end user's input. The navigation services server 320 receives the position data routinely, such as every minute, via the data network 370. In an alternative embodiment, the navigation services server 320 may request position information from the end users via the data network 370.

Referring to FIG. 11, at step 414, the market research application 388 identifies the advertising zone (or advertising zones) for which market research is to be collected. Because some market research is time dependent, the navigation services-server 320 identifies the current time. Steps 412 and 414 in FIG. 11 may occur in different orders with the advertising zones identified prior to determining the position of the end users.

Based on the end users' current positions, the market research application 388 identifies the end users located within the advertising zone (or advertising zones) identified for market research (step 416 in FIG. 11). The market research application 388 uses the geographic database 140 for this purpose. In addition to receiving current position information from the end users, the market research application 388 receives information identifying the end users. For example, when the navigation services server 320 receives data indicating the end user's current position, the navigation services server 320 also receives data identifying the end user. The end user may be a registered user of the navigation services provider 328, and the identifying data received may be an end user ID.

Once the marketing research application 388 has identified the end users located within the advertising zone(s), the market research application 388 creates and records market research information data records at step 418. Because market research information may be collected for only selected advertising zones at specified times, market research information date records are created for those specified advertising zones. In one embodiment, the market research information data record includes information regarding the number of end users within the advertising zone and a time at which the market research was collected. In addition, the market research information record may include data identifying each end user within the advertising zone, such as the end user's ID. Furthermore, the market research information record may include information regarding the advertising zone and a record ID. FIG. 10 illustrates the components of the market research information record according to one embodiment. In an alternative embodiment, the market research data record may have a different format for recording the number of end users, time, advertising zone, and end user identification.

Figure 12:
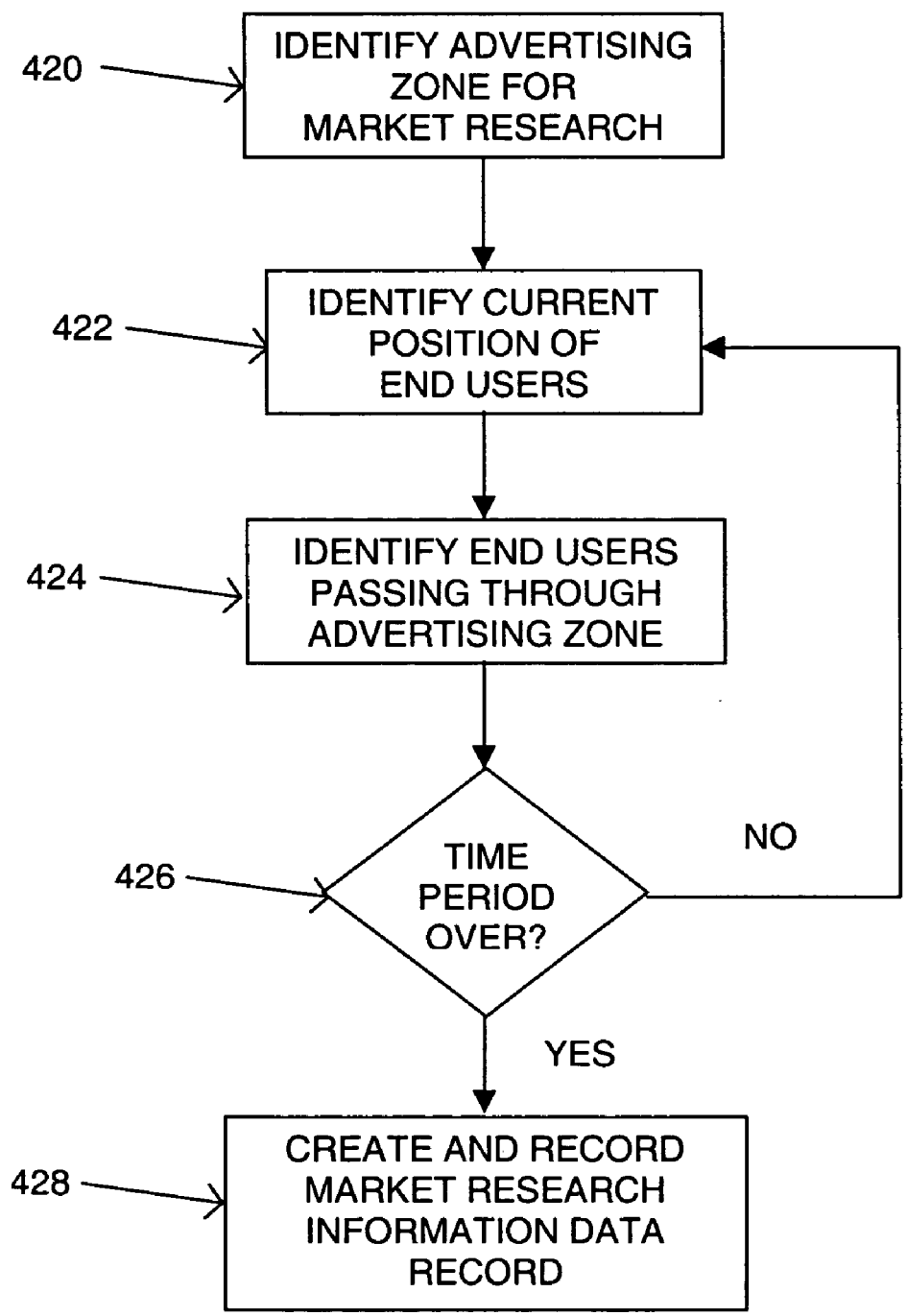
FIG. 12 is a flow chart of the operations of a navigation services server for collecting market research information in connection with an alternative embodiment.

FIG. 12 is a flow chart of the operations of the navigation services server 320 for collecting location-based market research information according to another embodiment. In the embodiment of FIG. 12, market research information is collected based on the number of end users passing through the advertising zone during a specified time period. The flow chart of FIG. 12 illustrates the operations of the navigation services server 320 collecting market research information for a single advertising zone. However, the navigation services server 320 may collect market research information for numerous advertising zones by following the steps of FIG. 12 for each of the advertising zones.

Referring to FIG. 12, at step 420, the market research application 388 identifies the advertising zone for which market research is to be collected. Because some market research is time dependent, the navigation services server 320 identifies the current time and uses the current time to identify the advertising zone. As an end user travels through the geographic region 100, the navigation services server identifies the current position of the end users at step 422. Steps 420 and 422 in FIG. 12 may occur in different orders with determining the position of the end users before identifying the market research advertising zones. In addition to receiving current position information from the end users, the market research application 388 receives information identifying the end users. For example, when the navigation services server 320 receives data indicating the end user's current position, the navigation services server 320 also receives data identifying the end user. The end user may be a registered user of the navigation services provider 328, and the identifying data received may be an end user ID.

Referring to FIG. 12, at step 424, the market research application 388 identifies the end users passing through the advertising zone identified for market research. In one embodiment, the market research application 388 uses the current position of the end users and the geographic database 140 for this purpose. The market research application 388 determines which end users are located within the advertising zone. Because the market research application is collecting information of the end users passing through the advertising zone during a specified time period, the market research application 388 determines if the specified time period has expired at step 426. If not, the market research application 388 returns to step 422 and identifies the current position of the end users. The market research application 388 continues to identify end users passing through the advertising zone until the time period expires. The market research application 388 may sample (e.g., identify the current position and end users passing through the advertising zone) periodically, such as every ten seconds. Because one end user may not completely pass through the advertising zone between consecutive samplings by the market research application 388, the market research application 388 identifies the end user that has not completely passed through the advertising zone. When the position of the end user places her/him within the advertising zone in consecutive samplings, the market research application identifies the end user only once as passing through the advertising zone.

If the time period for collecting the market research information is over at step 426, the market research application 388 continues to step 428. At step 428, the market research application 388 creates and records the market research information data record. In one embodiment, the market research information data record includes information regarding the number of end users passing through the advertising zone during the specified time period that the market research was collected. In addition, the market research information record may include data identifying each end user passing through the advertising zone, such as the end user's ID. Furthermore, the market research information record may include information regarding the time period, advertising zone and a record ID.

In one embodiment, the market research information data records have the format illustrated in FIG. 10, and market research information data records are stored on the market research database 398. In alternative embodiments, the market research information may be stored in any format and on any storage device.

Once the market research information data records have been created, the market research application 388 accumulates the demographic information regarding each of the end users identified in the market research data record. Because the market research information data record includes the identity of each of the represented end users, the demographic information for each identified end user may be readily accumulated into a market research report. In one embodiment, the market research database 398 includes end user demographic records 404 containing demographic information of end users. Using the end user identifications, the market research database 398 accesses the demographic information for the end users from the end user demographic records 404.

The type of demographic information accumulated for the market research report depends upon the agreement with the market researcher. For example, the agreement may specify that the types of vehicles and education level be included in the market research report. To satisfy the agreement, the market research application 388 identifies the type of vehicle and education level of each of the identified end users of the market research information data record. Once the necessary demographic information is identified for each represented end user, the market research application 388 generates the market research report. The market research report identifies the advertising zone and time(s) the market research information was collected. The market research report also identifies the number of end users and demographic information of the end users. For example, the market report may list that 100 vehicles passed through the advertising zone between 10:00 AM and 10:15 AM comprising 42 minivans, 12 sport utility vehicles, 37 sedans and 9 trucks.

VI. Alternatives

A. Standalone Systems

As explained above, there are different kinds of mobile and portable computing platforms that end users can use to obtain geographically-based features and services. As further explained above, these different kinds of mobile and portable computing platforms include standalone systems, such as in-vehicle navigation systems. With a standalone system, the navigation application software and geographic database are located locally, i.e., with the navigation system unit in the vehicle. The standalone systems are capable of performing the route calculation and route guidance applications.

Location-based market research can collected from end users who use standalone computing platforms to obtain geographically-related features and services. In the standalone computing platform, the geographic database and market research database are stored locally. The standalone system is also capable of performing the market research application. As the end user moves throughout the geographic region, the end user's position is determined using any appropriate means, such as positioning equipment. The market research application then determines whether the end user is located within or passing through an advertising zone for which market research is to be collected. If so, a local market research information data record is created and stored on the end user's standalone computing platform. The local market research information data record contains time and advertising zone information. The local market research information data record may also include information regarding the specific trip, such as origin and destination, average speed, duration of the trip, and any other information.

All of the local market research information data records collected for a period of time, such as one week or at time of geographic database renewal or update, are delivered to the navigation services server 320 over the data network 370. Once receiving numerous local market research information data records from various end users, the navigation services server 320 may assemble market research data records and create the market research reports.

B. Other Ways to Form Advertising Zones

In some of the above embodiments, advertising zones were shown as being bounded areas. Advertising zones (as well as other types of zones) are not limited to bounded areas. Advertising zones may also be defined based on accessibility, such as driving accessibility or walking accessibility. One example of an advertising zone based on accessibility is a zone that includes all the locations along roads within a defined driving distance (or driving time) of a specific location. For example, an advertising zone may be defined for all the roads within a 15 minute driving time (or distance) of an office building.

C. Market Research Points

Another way to collect location-based market research is to designate points along navigable roads as locations at which market research may be collected. With this method the navigation services provider 328 would then enter into agreements with market researchers to gather market research of the end users that pass the established market research point (or advertising point). Market research may be gathered for end users that pass within a certain distance of the market research point.

According to this embodiment, the advertising zone would be designated at specific locations along road segments. As described with the embodiment above, the navigation services provider 328 agrees to collect market research information and market research application identifies the end users who travels past the market research point location.

D. Market Research by Route

Another way to collect location-based market research is to collect the market research information according to a route traveled by the end user. In one embodiment, when the end user commences a trip, the end user requests a route from the end user's current position to a destination from the navigation services server 320. The end user's computing platform 330 supplies the end user's identification, current position and destination to the navigation services server 320 via the data network 370. The navigation services server 320 performs the route calculation application to determine a route comprising interconnected road segments using the geographic database 140 as described above. The navigation services server 320 then supplies the route to the end user's computing platform 330.

In one embodiment, the navigation services server 320 uses the calculated route to identify the advertising zone(s) that the end user is located in, will be located in or will be passing through. The calculated route is supplied to the market research application 388. Using the geographic database 140, the market research application 388 identifies the advertising zone(s) using the component road segments comprising the calculated route. These road segments comprising the calculated route are future positions of the end user. The market research application 388 may then create and record the market research information data records as described above in conjunction with FIGS. 11 and 12. The market research application 388 may estimate the time at which the end user will be within the advertising zones using the time when the route was supplied to the end user and the estimated times for traveling the component road segments comprising the calculated route.

E. Forming Dynamic Advertising Zones

Figure 13:
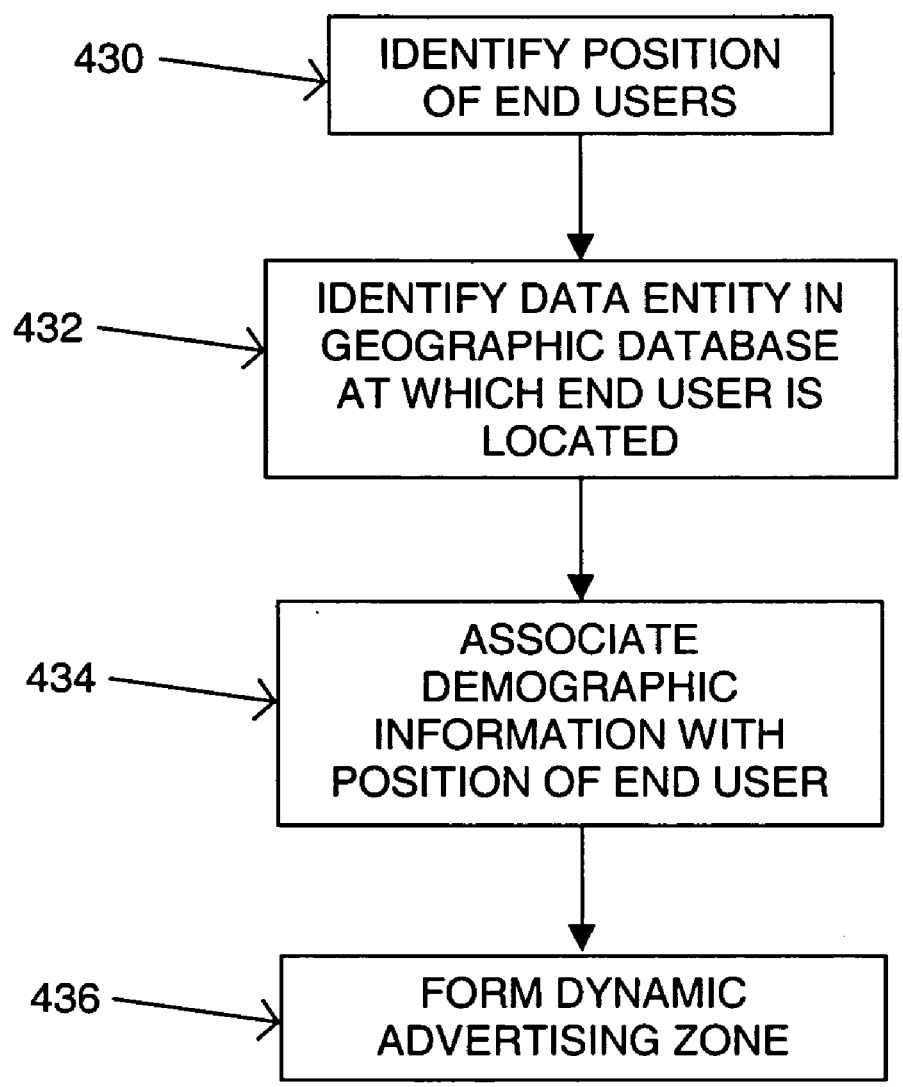
FIG. 13 is a flow chart of the operations of the navigation services server for forming dynamic advertising zones.

In one embodiment, market research information may be gathered to create and dissolve dynamic advertising zones in which end users receive information, such as advertising messages or other types of messages. Instead of collecting market research information for specified advertising zones, market research information of the end users within the geographic region is collected and dynamic advertising zones are formed based upon the end users' positions and demographic information. FIG. 13 is a flow chart of the operations of the navigation services server 320 for forming dynamic advertising zones. As the end users travel through the geographic region 100, the navigation services server 320 identifies the current position of the end users at step 430. The position of the end users may be determined as described above. Additionally, the future positions of the end users may be used in forming the dynamic advertising zone.

In one embodiment, for each of the end users, the navigation services server 320 identifies a data entity in the geographic database 140 representing a geographic feature at which the end users is approximately located at step 432. For example, the navigation services server 320 identifies the road segment on which the end user is located. At step 434, for each of the end users, the navigation services server 320 associates demographic information of the end user with the position at which the end user is located. In one embodiment, the demographic information is associated with the data entity of the geographic database 140 that represents the geographic feature at which the end user is approximately located. Next at step 436, the navigation services server 320 forms a dynamic advertising zone that encompasses a group of end users having certain demographic information.

Using the position and demographic information, the navigation services server 230 can establish where end users with desired demographics are located. For example, the navigation services provider 328 may identify in real time that numerous end users, such as twenty-five end users, are traveling along a certain road segment having certain desirable demographics, such as large families with young children. The navigation services provider may then form a dynamic advertising zone to encompass the certain road segment and the end users with the desirable demographics. After the dynamic advertising zone is formed, the navigation services server 320 may send information, such as an advertising message, to those end users within the dynamic advertising zone. The navigation services provider may again perform the steps in FIG. 13 and observe that the end users within the dynamic advertising zone do not have the desired demographics, so the navigation services provider dissolves the advertising zone. For forming the dynamic advertising zones, the navigation services provider may enter into agreements with advertisers to form dynamic advertising zones according to specified criteria. For example, the advertiser may specify to form a dynamic advertising zone to encompass at least thirty-five end users having demographic information of large families.

F. Applications for the Market Research Information

The market research information collected according to some of the above embodiments has several applications. Advertisers may use the market research information to direct advertising messages to end users moving through the geographic region. Additionally, the navigation services provider may use the market research information to establish advertising rates. Furthermore, advertisers may use the market research information to establish locations for physical billboards and to price the locations.

The market research information may also be used to establish historic patterns. For example, the market research may establish that during Thursday evening large number of minivans travel a certain road segment. Using the historic pattern, the navigation services provider may form an advertising zone covering the road segment and send advertising messages to end users within the formed advertising zone.

Businesses, such as retail stores and restaurants, may use the market research information to establish where to locate their businesses. The Government may use the market research information in civil planning, such as public transportation services, road network planning and road usage. Governmental agencies, such as civil defense services, may use create and dissolve dynamic advertising zones in which end users receive emergency messages. Additionally, Government agencies, such as police departments, may form an advertising zone around a crime scene to identify all end users fleeing the scene.

It is intended that the foregoing detailed description be regarded as illustrative rather than limiting and that it is understood that the following claims including all equivalents are intended to define the scope of the invention.

We claim:

1. A method of operating a mobile computing platform to obtain market research information comprising:

determining a position of each of a plurality mobile computing platforms as the mobile computing platforms travel in a geographic region;

for each of the mobile computing platforms, identifying a geographic database data entity that represents a geographic feature located in the geographic region at which the mobile computing platform is located;

determining in which of a plurality of advertising zones in which the geographic region is divided the mobile computing platforms are located in or are passing through;

for each of the mobile computing platforms, collecting market research data by associating a demographic data entity that indicates at least one of: age, sex, family information, education level, income, employment status and residential address, for a user of the mobile computing platform with the identified geographic database data entity that represents the geographic feature at which the mobile computing platform is located; and creating a market research record.

2. The method of claim 1 wherein the mobile computing platforms receive geographically-related services from a navigation services server over a wireless communications link.

3. The method of claim 1 wherein the geographic database is installed in a standalone navigation system.

4. The method of claim 1 wherein the market research record contains a time record.

5. The method of claim 1 further including creating a market research record containing a number of mobile computing platforms located within the advertising zone.

6. The method of claim 1 further including creating a market research record containing an identification of each of the mobile computing platforms located within the advertising zone.

7. The method of claim 1 further including creating a market research record containing demographic information for each of the mobile computing platforms located within the advertising zone.

8. The method of claim 1 wherein the demographic data entity also indicates a type of vehicle information.

9. The method of claim 1 further comprising collecting trip information.

10. The method of claim 1 after the step of associating the demographic data entity further including forming a dynamic advertising zone.

11. A method of forming a dynamic advertising zone comprising:
   determining a position of each of a plurality of mobile computing platforms as the mobile computing platforms travel in a geographic region;
   for each of the mobile computing platforms, identifying a geographic database data entity that represents a geographic feature located in the geographic region at which the mobile computing platform is located;
   determining in which of a plurality of advertising zones in which the geographic region is divided the mobile computing platforms are located in or are passing through;
   collecting market research data by associating a demographic data information that indicates at least one of: age, sex, family information, education level, income, employment status and residential address, for a user of the mobile computing platform with the identified geographic database data entity that represents the geographic feature at which the mobile computing platform is located;
   creating a market research record; and
   using the market research data to form a new advertising zone to encompass the positions of a predetermined number of mobile computing platforms having predetermined demographic information,
   wherein said new advertising zone defining an area for targeting advertising messages.

12. The method of claim 11 wherein the step of determining the position identifies a road segment that the mobile computing platform will be traveling based on an original route over a plurality of interconnected road segments from an origin to a destination.

13. The method of claim 11 further including for each of the mobile computing platforms, identifying a data entity in a geographic database that represents a road segment located in the geographic region on which the mobile computing platform is located.

14. A method of collecting market research information comprising:
   defining an advertising zone within a geographic region,
   wherein said advertising zone represented by advertising zone data identifying geographic database data entities that represent geographic features located in the advertising zone;
   calculating a route for a mobile computing platform to travel from an original position of the computing platform to a destination, the route comprising a plurality of interconnected road segments within the geographic region;
   determining if any of the road segments of the calculated route are located in or pass through the advertising zone; and
   if so, collecting market research data by associating demographic information that indicates at least one of: age, sex, family information, education level, income, employment status and residential address, of a user of the computing platform with advertising zone data that identify geographic database data entities that represent geographic features located in the advertising zone;
   creating a market research record.

15. The method of claim 14 wherein the market research record contains a time record.

16. The method of claim 14 wherein the demographic information is preference information of the computing platform.

17. A method of collecting market research information comprising:
   defining a market research zone,
   wherein said market research zone represented by market research zone data identifying geographic database data entities that represent geographic features located in the market research zone;
   determining which of a plurality of mobile computing platforms are located in or pass through the market research zone as the mobile computing platforms move through the geographic region; and
   creating a market research record by associating a demographic data entity that indicates at least one of: age, sex, family information, education level, income, employment status and personal preferences, for a user of the mobile computing platform that are located in or passed through said market research zone with market research zone data that identify geographic database data entities that represent geographic features located in said market research zone.

18. The method of claim 17 wherein said demographic data entity is income information.

19. The method of claim 17 wherein said demographic data entity is education level information of the user of the computing platform.

20. The method of claim 17 wherein said demographic data entity is family information of the user of the computing platform.

21. The method of claim 17 wherein said demographic data entity is age or sex information of the user of the computing platform.

* * * * *